United States Patent [19]

Inoue

[11] 4,417,965

[45] Nov. 29, 1983

[54] METHOD OF TREATING A RARE-EARTH MINERAL

[75] Inventor: Kiyoshi Inoue, Tokyo, Japan

[73] Assignee: Inoue-Japax Research Incorporated, Yokohama, Japan

[21] Appl. No.: 274,258

[22] Filed: Jun. 16, 1981

[30] Foreign Application Priority Data

Jun. 20, 1980 [JP] Japan .................................. 55-84362

[51] Int. Cl.³ .............................................. C25B 1/00
[52] U.S. Cl. .................................... 204/164; 204/130
[58] Field of Search ................... 204/164, 130, 86, 93, 204/94, 96

[56] References Cited

U.S. PATENT DOCUMENTS

| | | | |
|---|---|---|---|
| 2,167,718 | 8/1939 | Harris, Jr. et al. | 204/31 |
| 2,250,851 | 7/1941 | Adamoli | 23/19 |
| 2,616,843 | 11/1952 | Sheer et al. | 204/164 |
| 3,341,437 | 9/1967 | Wood | 204/61 |
| 3,383,294 | 5/1968 | Wood | 204/64 |
| 3,619,128 | 11/1971 | Angstadt | 23/18 |
| 3,649,497 | 3/1972 | Kugler et al. | 204/164 |
| 3,925,177 | 12/1975 | Kofoid | 204/164 |

FOREIGN PATENT DOCUMENTS 142102 10/1947 Australia ............................ 204/164

Primary Examiner—R. L. Andrews
Attorney, Agent, or Firm—Karl F. Ross; Herbert Dubno

[57] ABSTRACT

A method of treating a rare-earth mineral or concentrate, e.g. monazite and/or bastnaesite, wherein the rare-earth mineral or concentrate in a pulverized form is mixed with an aqueous solution of electrolyte and subjected to an electrical discharge effected in a region between a pair of electrodes in the presence of the solution.

15 Claims, 4 Drawing Figures

METHOD OF TREATING A RARE-EARTH MINERAL

FIELD OF THE INVENTION

The present invention relates generally to a dissociation technique customarily encountered in the refining of a rare-earth material. More particularly, it relates to a new and improved method of treating a rare-earth mineral or concentrate, e.g. monazite and or bastnaesite, to dissociate it into a rare-earth compound, e.g. $R(OH)_3$, from which a desired rare-earth element R such as lanthanum, cerium, praseodymium, neodymium, samarium or gadolinium, or a combination of them or "misch metal" (hereinafter referred generally as rare-earth substance) can readily be recovered.

BACKGROUND OF THE INVENTION

It may be known that a rare-earth substance is extracted from a variety of source minerals such as monazite, bastnaesite, gadolinite and xenotime which contain a rare-earth concentrate in the forms of $(Th,R)PO_4$, $RFCO_3$, $(Be,Fe)R_2Si_2O_{10}$ and $RPO_4$, respectively. In refining, it is necessary therefore to treat each of these source materials or rare-earth concentrates to separate or free or rare-earth compound from its other components. This separation or dissociation step has heretofore been carried out purely chemically. Thus, monazite, bastnaesite or xenotime has been treated with sulfuric acid, sodium sulfate, sodium hydroxide, hydrogen chloride and/or ammonium chloride to yield the rare-earth compound in the form of $R(OH)_3$ or $R_2O_3$ separated from thorium sulfate, hydrogen phosphate, sodium sulfate, carbon dioxide, silicon fluoride, hydrogen fluoride, sodium phosphate, sodium hydroxide, thorium hydroxide, thorium ions, sulfate radical and/or phosphate radical.

Not only do these prior dissociation processes require a high concentration of the reactant, $H_2SO_4$, $Na_2SO_4$, HCl, $NH_3Cl$, which adds to cost, but they also requires a relatively high temperature for the reaction which amounts to 200° to 250° C. or around 150° C. to be employed and maintained for a relatively long time period amounting to several hours. Furthermore, a large amount of noxious gases such as $SO_3$ and HF and even noxious alkaline mists may unavoidably be generated, necessitating a large and costly gas-treatment facility. It should be noted therefore that the prior dissociation processes are undesirable or unsatisfactory not only from energy and resource saving standpoints but from economical consideration for the equipment as well as cost consideration of rare-earth elements that are produced thereby.

Another problem encountered heretofore in the rare-earth material field is that one existing dissociation process (e.g. an alkaline dissociation process) applicable to one particular rare-earth mineral (e.g. monazite) is generally not applicable to another mineral (e.g. bastnaesite). Thus, where two different types of the rare-earth source are produced in a mixed mineral as, for example, produced by the Baiyun mine in China which contains 40% monazite and 60% bastnaesite, the prior-art technique has been prohibitively inefficient or even impractical.

OBJECTS OF THE INVENTION

It is accordingly an important object of the present invention to provide a new and improved method of dissociating a rare-earth mineral or concentrate, e.g. monazite and/or bastnaesite, into a rare-earth compound, which method is relatively simple in procedural steps, efficient in energy and resource saying, less costly in operation, capable of producing desired rare-earth substance at a reduced cost, capable of operation either on a batch or continuous basis, applicable even to a mixed rare-earth mineral concentrate (e.g. monazite plus bastnaesite) and operable generally independently of the types of rare-earth source.

Another important object of the invention is to provide a rare-earth mineral or concentrate dissociation method which is greater in yield with respect to a suitable rare-earth compound such as rare-earth hydroxide $[R(OH)_3]$, rare-earth sulfate $[R_2(SO_4)_3]$ or rare-earth chloride $(RCl_3)$ and which is capable of reducing the amount of toxic gases and fluid and may eliminate the need for costly and large-size anti-pollution equipment.

A further object of the invention is to provide a method of dissociating a rare-earth mineral or concentrate into a desired rare-earth component, which can be carried out in apparatus which is relatively simple and yet economical in operation, versatile in the operational capability of handling a variety of rare-earth source minerals and capable of eliminating environmental pollution problems.

SUMMARY OF THE INVENTION

The method according to the invention resides in a physicochemical process and generally comprises subjecting a pulverized rare-earth mineral or concentrate (e.g. monazite, bastnaesite, gadolinite and/or xenotime) in a mixture with an aqueous solution of an electrolyte to an electrical discharge effected in a region between a pair of electrodes, i.e. bridging directly between the electrodes or produced between one of the electrodes and the solution of electrolyte. The solution has an electrolyte, which may be an acid (e.g. sulfuric acid), alkali (e.g. sodium hydroxide) or salt (e.g. sodium chloride), contained at a relatively low concentration and is used on one hand to carry the rare-earth mineral or concentrate in a pulverized form and on the other hand to form a medium through which the high-density electrical discharge develops. The pulverized rare-earth mineral or concentrate is thus exposed to or passed in contact with a high-density discharge and is physicochemically dissociated, in conjunction with an essential component element or elements into the desired compound, e.g. rare-earth hydroxide $[R(OH)_3]$, rare-earth sulfate $[R_2(SO_4)_3]$ or rare-earth chloride $(RCl_3)$ from which a desired rare-earth element or substance R can readily be recovered.

Specifically, the electrolyte may be at least one substance selected from the group which consists of potassium acetate, ammonium hydroxide, ammonium chloride, sodium chloride, sulfuric acid, sodium carbonate, sodium hydroxide and potassium hydroxide, but should preferably be sodium hydroxide. The electrolyte may be contained in the solution at a proportion of 5 to 25% by weight. The pulverized rare-earth mineral or concentrate may have a particle size ranging between 100 to 400 mesh.

The method can be carried out, an apparatus for treating a rare-earth mineral in a pulverized form, which apparatus comprises: a power supply; a pair of electrodes energizable by the power supply for effecting an electrical discharge in a region therebetween in the presence of an aqueous solution of an electrolyte; and means for positioning the rare-earth mineral or concentrate in contact with the electrical discharge.

BRIEF DESCRIPTION OF THE DRAWING

These and other objects and features of the present invention as well as advantages thereof will become more readily apparent from the following description of certain embodiments thereof taken with reference to the accompanying drawing in which.

SPECIFIC DESCRIPTION

Figure 1A:
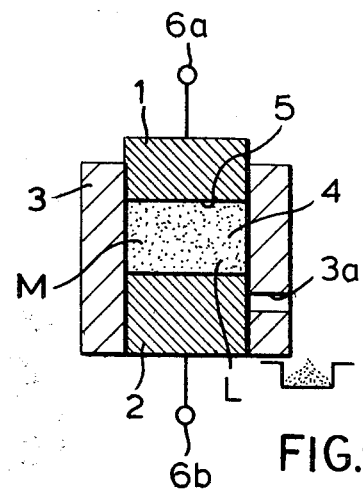
FIGS. 1A and 1B are diagrammatic sectional views illustrating the principles of the present invention embodied in a wide and narrow interelectrode spacing arrangements, respectively.
Figure 1B:
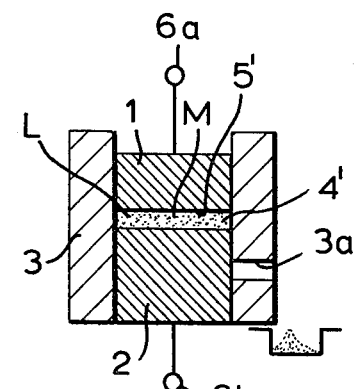

FIGS. 1A and 1B show a pair of disk, plate or block shaped electrodes 1 and 2 composed of graphite, ferrite or any other suitable wear-resistant and anti-acid or anti-alkaline material and juxtaposed to define between them a relatively wide gap spacing 4 (FIG. 1A) or a relatively narrow gap spacing 4' (FIG. 1B) in a receptacle 3 which conforms in shape with the electrodes 1 and 3. Both electrodes 1 and 2 are slidably received in the receptacle 3 and vertically movable therein to provide the spacing 4, 4' for loading with and retaining a mass of pulverized rare-earth mineral or concentrate material M in mixture with a liquid electrolyte L in aqueous solution. The receptacle 3 is composed of or lined with an insulating material and may be cylindrical, square or rectangular elongated in either a vertical or horizontal plane to shape the chamber 5, 5' accordingly to tightly seal it. The mixture in the chamber 4, 4' contains by volume 3 to 7 parts of the material M and 7 to 3 parts the liquid L or an aqueous solution containing an electrolyte in an amount of 10 to 20% by weight. The particle size of the rare-earth mineral M ranges, say, between 200 and 400 mesh.

The receptacle is formed with an outlet opening 3a for removal of a treated material M. After treatment of the material according to the invention, the lower electrode 2 is moved down to a position in flush with the lower surface of the opening 3a and then the upper electrode 1 is moved down to push the treated material M+L gradually out of the chamber 4, 4' through the opening 3a for recovery. The electrodes 1 and 2 are thereafter moved back to the positions shown where the electrode 2 is stopped. The electrode 1 is then moved further up to open the chamber 5, 5' to allow an untreated material M+L to be introduced therein. When the chamber 5, 5' is elongated in the direction perpendicular to the plane of the paper of the drawing, the electrodes 1 and 2 may be arranged to be stationary and the opening 3a dispensed with. Then a pair of pistons may be slidably inserted into the chamber 5, 5' and movable in that direction forth and back, to allow for the loading and removal of the mass M+L in the manner generally described.

The electrodes 1 and 2 have power terminals 6a and 6b connected to a power supply (not shown) which furnishes electrical energy for physicochemically treating the rare-earth mineral or concentrate M in mixture with the liquid electrolyte L. Thus, in each of the systems shown in FIGS. 1A and 1B, it has been observed that electrical discharges develop across at least a region of the spacing 4, 4' between the electrodes 1 and 2, and the particles of the mineral M are disposed within or in contact with, the electrical discharges to facilitate decomposition of the mineral M and recombination of rare-earth elements with the essential components of the liquid L. With the system shown, while complete elimination of the generation of dust particles, gases and mists are difficult to achieve, it has been found that there develop practically no fluorine gases, phosphorous gases, SOx (sulfur oxides) or mists which pollute the environmental air.

FIGS. 1A and 1B illustrate systems which differ from each other in the size of gap spacing 4, 4' between the electrodes 1 and 2. In the FIG. 1B system, electrical discharges are effected directly between the electrodes 1 and 2 and the bridge across the narrow spacing 4' through the mixture of materials M and L in mixture, thereby establishing a high-energy-density field throughout the chamber 5'. In the FIG. 1A system on the contrary, an electric current is passed between the electrodes 1 and 3 through the electrolyte L to electrolytically produce a gaseous layer on one of the electrodes which is poled negative. Electrical discharges develop through the gaseous layer between the negative electrode and the electrolyte L. When the voltage between the electrodes 1 and 2 exceeds a certain value, the surface of the negative electrode tends to be intensively heated. However, the system of FIG. 1A makes use of the stabilized electrical discharge condition prior to initiation of such excessive heating condition.

EXAMPLE

The liquid electrolyte L consists of an aqueous solution containing 10 to 20% by weight of sodium hydroxide (NaOH) and each of various rare-earth concentrates identified below is mixed in an amount of 30% by volume with the liquid electrode. The concentrate is in the form of particles having a particle size of 300 mesh. The mixture is exposed to electrical discharges of green/blue color which jump between an electrode and the electrolyte L spaced by a distance of 5 mm from the electrode across an electrolytically produced gaseous layer. It has been found that:

(1) The rare-earth concentrate being monazite, rare-earth hydroxide [R(OH)$_3$] and sodium phosphate (Na$_3$PO$_4$) are produced. No harmful gas is produced.

(2) The rare-earth concentrate being bastnaesite, rare-earth hydroxide [R(OH)$_3$], sodium fluoride (NaF) and sodium carbonate (Na$_2$CO$_3$) are produced. No harmful gas is produced.

(3) The rare-earth concentrate being a mixture of monazite (4 parts) and bastnaesite (6 parts), rare-earth hydroxide [R(OH)$_3$], sodium phosphate (Na$_3$PO$_4$), sodium fluoride (NaF) and sodium carbonate (Na$_2$CO$_3$) are produced. No harmful gas is produced.

In each of the above, the yield appears to reach as high as 90 to 95%. Thus, initially the contents of rare-earth elements in each concentrate are measured. After the discharge treatment, the rare-earth hydroxide [R(OH)$_3$] sediment is collected by filtration and then washed with water of 100° C. The washed rare-earth hydroxide is then with 5% hydrochloric acid solution at 100° C. for 40 minutes to yield a solution. Upon adjustment of its pH value at 5.8 to 6.0, the solution is freed from a sediment containing thorium hydroxide, yttrium compounds and a minor amount of rare-earth substance and is concentrated by boiling. Then by drying the centrate, rare-earth chloride ($RCl_3$) is obtained and measured. It is shown that the yield of rare-earth substance is 92 to 93%. Alternatively, the above solution is neutralized with sodium hydroxide to yield a sediment which is the rare-earth hydroxide. The measurement of this sediment also shows that the yield of rare-earth substance is 92 to 93%.

EXAMPLE II

The liquid electrolyte L consists of an aqueous solution of ammonium chloride ($NH_4Cl$) and a mixed rare-earth concentrate containing monazite (4 parts) and bastnaesite (6 parts) is mixed therewith. It has been found that exposing this mixture to electrical discharges produces rare-earth hydroxide [$R(OH)_3$] and rare-earth chloride ($RCl_3$) and additionally harmful gases such as fluorine ($F_2$), hydrogen fluoride (HF), chlorine ($Cl_2$) and ammonium fluoride ($NH_4F$) together with other harmful gases in lesser amounts including $NH_4HF_2$, $PCl_3$ and POCl. Simultaneously, phosphoric acid is also produced.

EXAMPLE III

The liquid electrolyte L consists of an aqueous solution of sodium chloride and the monazite plus bastassite mixture is mixed therewith. It has been found that exposing this mixture to electrical discharges produces $R(OH)_3$ and $RCl_3$ together with lesser amounts of harmful gases including NaF, $Cl_2$, $PCl_3$ and POCl. Simultaneously, sodium phosphate ($Na_3PO_4$) is also produced.

EXAMPLE IV

The liquid electrolyte L consists of concentrated sulfuric acid or an aqueous solution of $H_2SO_4$ and the monozite and bastnaesite mixture is mixed therewith. It has been found that exposing this mixture to electrical discharges produces rare-earth sulfate [$R_2(SO_4)_3$], phosphoric acid ($H_3PO_4$) and harmful gases including $F_2$, HF and SOx.

EXAMPLE V

The liquid electrolyte L consists of an aqueous solution of sodium carbonate ($NaCO_3$) and the monazite and bastnaesite mixture is mixed therewith. It has been found that exposing this mixture to electrical discharges produces rare-earth hydroxide [$R(OH)_3$] and sodium phosphate ($Na_3PO_4$). No harmful gas is produced.

EXAMPLE VI

The liquid electrolyte L consists of an aqueous solution of potassium hydroxide (KOH) and the monazite and bastnaesite mixture is mixed therewith. It has been found that exposing this mixture to electrical discharges produces rare-earth hydoxide [$R(OH_3)$], potassium phosphate ($K_3PO_4$), potassium fluoride (KF) and potassium carbonate ($K_2CO_3$). No harmful gas is produced.

Figure 2:
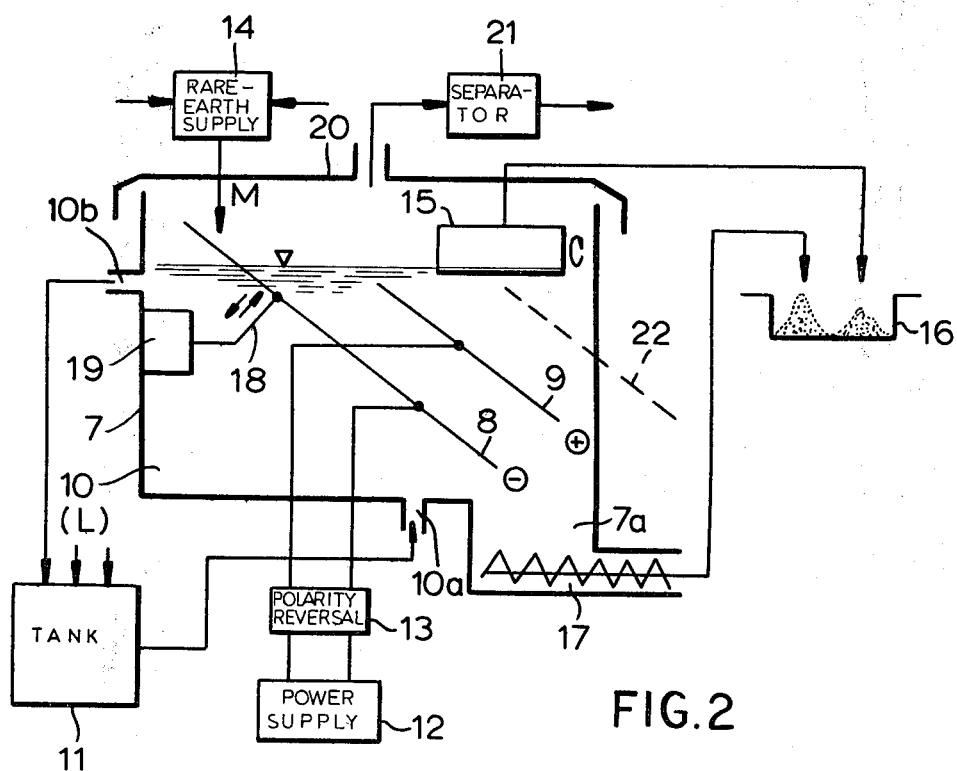
FIG. 2 is a diagrammatic view of an apparatus according to the invention.

FIG. 2 shows an apparatus for carrying out the method of the invention on a continuous basis. The apparatus comprises a treatment vessel 7 in which a pair of electrodes 8 and 9 are arranged. The vessel 7 contains a liquid electrolyte 10 which may consist of an aqueous solution containing by 15% by weight sodium hydroxide (NaOH). The liquid electrolyte 10 is introduced into the vessel 7 through an inlet 10a formed through a floor portion thereof and is led out through an outlet 10b at an upper wall portion of the vessel 7 into a liquid processing tank 11. The tank 11 may, though not shown, have a filtration unit for removing foreign matter, a temperature control unit for cooling or maintaining the collected liquid electrolyte at a given temperature and a concentration control unit for maintaining the concentration of the liquid electrolyte within a given range. The purified and adjusted liquid electrolyte 10 is returned from the tank 11 to the treatment vessel 7 through the inlet 10a.

The electrode 8 is of a plate form inclined at an angle and ordinarily poled as cathodic whereas the counter-electrode 9 is of a plate, screen or lattice form arranged in parallel with the electrode 8 with an adequate spacing and ordinarily poled as anodic. The electrodes 9 and 9 are energized by a power supply 12. A polarity reversal switch 13 is shown connected between the power supply 12 and the electrodes 8, 9. This switch is actuated to reverse the electrode polarity to give a measure against the contamination, wear and overheating of the electrodes 8 and 9, and may be operated periodically in response to timing signals. Alternatively, a sensor or sensors (not shown) may be provided to detect the contamination, wear and/or overheating of the electrodes each exceeding a preset threshold and to act on the switch 13 when the threshold is exceeded to reverse the electrode polarity.

Shown at 14 is a supply unit for a rare-earth mineral or concentrate M to be treated which is in a pulverized from having a suitable particle size, say, 200 to 400 mesh. The pulverized mineral or concentrate M may be mixed with an amount of the liquid electrolyte 10 (L) in the unit 14 to form a slurry. The pulverized mineral M with or without the liquid electrolyte L is fed to the surface of the electrode 8 at an upper portion thereof and allowed to advance imder gravity along this surface. In the course of its movement, the rare-earth mineral M is exposed to electrical discharges which develop on the surface of the electrode 8 as an electrolytic current is passed from the power supply 12 between the electrodes 9 and 8. A portion of the discharge-treated particles M is carried with electrolytically generated gases, discharge-formed vapor and gas bubbles to float on the surface of the liquid electrolyte 10 in the vessel 7. The remainder of the discharge-treated particles M is allowed to move further down along the surface of the electrode 8 and deposited in a recess 7a on the floor of the vessel 7.

The scum containing the discharge-treated particles M floating with the gaseous bubbles are collected into a drum-shaped adsorption separator 15 where they are dewatered for collection into a receptacle 16. The discharge-treated particles M falling into the recess 7a are caught and carried by a conveyor 17 for collection into the receptacle 16 or a separate collecting unit.

The electrode 8 is supported by an arm 18 which adjusts the angle of inclination thereof in the treatment vessel 7. The arm 18 may be vibrated by a vibrator 19 which imparts mechanical vibrations to the electrode 8, thereby facilitating or controlling the movement under gravity of the material M along the electrode 8 surface. The vibrations also serve to maintain a desirable uniform distribution of the mineral particles M on the electrode 8 surface.

The gases, vapors and mists evolving from the surface of the liquid 10 in the vessel 7 are collected by a cover 20 in the space defined therewith, and are suction-drained and led to a separator unit 21.

A further discharge electrode may be provided at a position as shown by broken line 22 in spaced juxtaposition with the electrode 9. Of course, a plurality of such further electrodes may also be arranged. The surface of each such electrode is furnished with the material M for treatment in a manner as has been described.

EXAMPLE VII

A rare-earth mineral concentrate consisting of 30% monazite and 70% bastnaesite contains 60% by volume of rare-earth substance. The concentrate is crushed into particles so that 99% of them have a particle size of 200 mesh. The particles are introduced into an aqueous solution containing 10% by weight sodium hydroxide (NaOH) and moved in suspension therein with a proportion by volume of 35% between a pair of graphite plate electrodes which are spaced apart with a distance of 30 mm from each other. The electrodes are energized with a succession of electrical pulses having a no-load voltage of 200 volts, a pulse duration of 8 microseconds, a pulse interval of 4 microseconds and a peak discharge current of 100 amperes. Intense and stabilized spark discharges develop on the surface of the electrode poled negatively and in contact with the liquid electrolyte. The discharges have a load voltage of 50 volts and a mean current of 5 amperes. It has been found that the treatment for 100 grams of the rare-earth concentrate takes a treatment time of 15 minutes, requires a power consumption of (50 volts×5 amperes=250 watts) 86 Kcal and consumes 30 grams of sodium hydroxide. The temperature of the liquid electrolyte is maintained at or slightly above 40° C. When the sedimentation is washed with water of 100° C. and thereafter treated with 8% HCl at 100° C. for 10 to 30 minutes, 92% of the rare-earth compound is recovered, which contains 81 grams of $RCl_3$. The extraction with the hydrochloric acid requires an energy of 20 Kcal and a consumption of 300 grams of HCl.

In comparison, the same rare-earth concentrate (monazite and bastnaesite mixture) according to the prior art is capable of treatment only with the sulfuric acid process which requires energy and reacting materials for 100 grams of the concentrate as detailed below. Thus, the concentrate is treated with a concentrated sulfuric acid (300 to 1600 grams $H_2SO_4$) heated at 250° C. for a period of 90 minutes (30 to 135 KCal) and thereafter extracted with cooled water (extraction rate of 91%). This is followed by filtration and thereafter thorium-separation. The subsequent neutralization with sodium hydroxide (60 to 320 grams) and alkaline treatment (boiling) yields 64 grams of rare-earth hydroxide. The further subsequent extraction with hydrochloric acid requires an energy of 10 to 20 and a consumption of 300 grams of HCl to yield 81 grams of $RCl_3$.

Calculations show that according to the invention, the total cost for energy and chemicals up to the stage mentioned above is reduced to about one half when compared with the prior-art process. It should be noted further that the prior process in which the emission of harmful gases and mists is unavoidable will make it essential to install and operate a costly additional equipment for treating these emissions and such an equipment may be dispensed with or operated with less cost in the method of the invention which altogether eliminates or significantly reduces these emissions.

Figure 3:
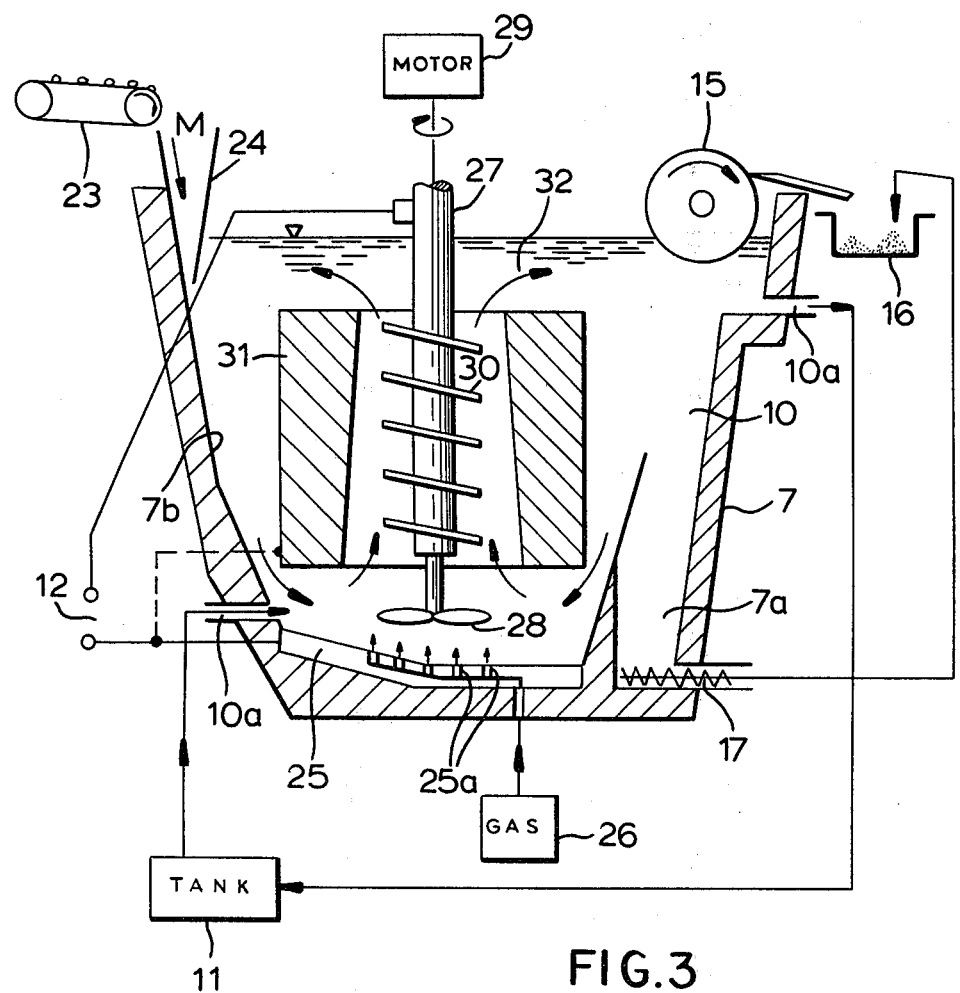
FIG. 3 is a diagrammatic and sectional view illustrating another apparatus according to the invention.

A further apparatus of the invention shown in FIG. 3 in which the same reference numerals as in FIG. 2 refer to the same or simular functional parts is designed to discharge-treat the rare-earth mineral particles M in a state of dynamic agitation with the liquid electrolyte L in the treatment vessel 7.

In the arrangement of FIG. 3, a rare-earth mineral or concentrate M in a pulverized form or alternatively in the form of a slurry of mineral particles with an aqueous solution of electrolyte L is transported with a conveyer 23 into a hopper 24 which is open into the vessel 7. The treatment vessel 7 in this embodiment has a plate electrode 25 securely attached to the floor thereof. The plate electrode 25 may be porous or formed with a multiplicity of small openings 25a communicating with a gas supply 26 to inject air or a gas into the liquid L in the vessel 7. A conductive rod 27 which is vertically suspended into the liquid L and has a fan electrode 29 securely at its lower end opposed with the plate electrode 25 and is rotated by a rotary drive 29 to produce dynamic flows of the liquid electrolyte L in the vessel 7. The conductive rod 27 is formed with a herical projection 30 and, which when rotated, thereby produces upwardly moving vortexes therearound. The herical projection 30 is spacedly surrounded by a cylinder 31 to facilitate the formation of flows of the liquid electrolyte as shown by arrows 32. The discharge power supply 12 is connected to the electrode 25 and the conductive rotary rod 27.

The rare-earth material M fed through the hopper 24 into the vessel 7 moves down under gravity along an inner wall portion 7b thereof and then is entrained on the liquid flows created in the vessel 7. A stream of the liquid electrolyte L introduced through the inlet 10a act to further force the material M carried with the liquid electrolyte L towards the region between the stationary electrode 25 and the rotating electrode 28. The gas supplied under pressure from the source 26 is bubbled through the openings 25a to keep the particles M against depositing on the electrode 28.

The rotating electrode 28 is here poled as cathodic and thus develops electrical spark discharges along its moving surface. As mentioned previously, these discharges bridge across a thin uniform gaseous layer generated electrolytically on the cathodic electrode surface, thus between the latter and the electrolyte spaced therefrom by this layer. The rare-earth mineral particles M are carried by the moving liquid electrolyte L into the region of the electrode 29 where they are exposed to the electrical discharges. As shown hereinbefore, this causes the exposed material M to be dissociated or reduced into one or more rare-earth compounds as have been specified. A portion of the discharge-treated material M rises, partly by the upwardly directed liquid flows and partly by the gas bubbles evolving from the electrode region, to the surface of the liquid where it is collected by the adsorption separator 15. The rising of this portion of the discharge-treated material M is facilitated by further gaseous injection-formed through the openings 25a from the gas supply 26. The other discharge-treated material M tends to settle towards the floor of the vessel 7 where it is caught by the conveyer 17 and led out of the vessel 7.

What is claimed is:

1. A method of dissociating a rare-earth mineral or concentrate in a pulverized form, comprising the steps of:

positioning the pulverized rare-earth mineral or concentrate in mixture with an aqueous solution of an electrolyte at least in a region between a pair of electrodes, said electrolyte being at least one substance selected from the group which consists of potassium acetate, ammonium hydroxide, ammonium chloride, sodium chloride, sulfuric acid, sodium carbonate, sodium hydroxide and potassium hydroxide; and effecting electrical discharges between said electrodes at least through said region in the presence of said solution of the electrolyte whereby the individual particles of said rare-earth mineral or concentrate are subjected to said electrical discharges so as to form a rare-earth metal compound of the electrolyte.

2. The method defined in claim 1 wherein said rare-earth mineral or concentrate is at least one ore selected from the group which consists of monazite, bastnaesite, gadolinite and xenotime.

3. The method defined in claim 2 wherein said rare-earth mineral is at least one ore selected from the group which consists of monazite and bastnaesite.

4. The method defined in claim 1 wherein said electrolyte is contained in said solution at a proportion of 5 to 25% by weight.

5. The method defined in claim 1 wherein said pulverized mineral or concentrate has a particle size in the range between 100 and 400 mesh.

6. The method defined in claim 1 wherein said electrical discharges are effected across substantially the entire spacing between said electrodes through said electrolyte.

7. The method defined in claim 1 wherein said electrical discharges are effected on the surface of one of said electrodes which is poled cathodic and between said surface and said solution of electrolyte across a thin, uniform layer of gases produced electrolytically.

8. The method defined in claim 1 wherein a mass of said pulverized rare-earth mineral or concentrate in mixture with said aqueous solution of electrolyte is retained between said electrodes in contact therewith, and an electric current is passed between said electrodes to effect said electrical discharges at least through said region.

9. The method defined in claim 8 wherein said pulverized mineral or concentrate is mixed with said solution at a proportion of 30 to 70% by volume.

10. The method defined in claim 1 wherein said pulverized rare-earth mineral or concentrate is advanced on a continuous support along a predetermined transport path and into and through said region.

11. The method defined in claim 10 wherein at least a portion of said continuous support is the surface of one of said electrodes juxtaposed with the other.

12. The method defined in claim 11 wherein said one electrode is poled as cathodic.

13. The method defined in claim 10, further comprising imparting vibrations to said support.

14. The method defined in claim 1, further comprising dynamically moving said solution of electrolyte at least through said region to pass said pulverized rare-earth mineral or concentrate in suspension with the moving solution through said region.

15. A method of dissociating a rare-earth mineral or concentrate in a pulverized form, comprising the steps of:

disposing particles of said pulverized rare-earth mineral or concentrate mixed with an aqueous solution containing 5 to 20% by weight of sodium hydroxide at least in a region between a pair of electrodes; and producing intermittent electrical discharges between said electrodes at least through said region in the presence of said solution so that the individual particles of said rare-earth mineral or concentrate are subjected to said electrical discharges to form a rare-earth metal hydroxide compound.

* * * * *